United States Patent [19]
Melian

[11] 3,764,974
[45] Oct. 9, 1973

[54] VEHICLE FUNCTIONAL STATUS AND MONITOR SYSTEM

[76] Inventor: Cecilio Melian, 511 Forest Drive, Casselberry, Fla. 32707

[22] Filed: Aug. 1, 1972

[21] Appl. No.: 276,914

[52] U.S. Cl. .............................. 340/52 F, 307/10 R
[51] Int. Cl. .......................................... G08b 19/00
[58] Field of Search ............. 340/52 R, 52 D, 52 F; 307/10 R

[56] References Cited
UNITED STATES PATENTS

| | | | |
|---|---|---|---|
| 3,665,384 | 5/1972 | Ives | 340/52 F |
| 2,994,073 | 7/1961 | Pelovitz | 340/52 F |
| 2,288,683 | 7/1942 | Clancy | 340/52 F |
| 1,481,471 | 1/1924 | LaLonde | 340/52 F |

Primary Examiner—Alvin H. Waring
Attorney—John B. Dickman, III

[57] ABSTRACT

The invention relates to a vehicle function monitor and warning system incorporating audio and visual warning means controlled by a relay responsive to a plurality of electrically isolated condition responsive switch means.

10 Claims, 1 Drawing Figure

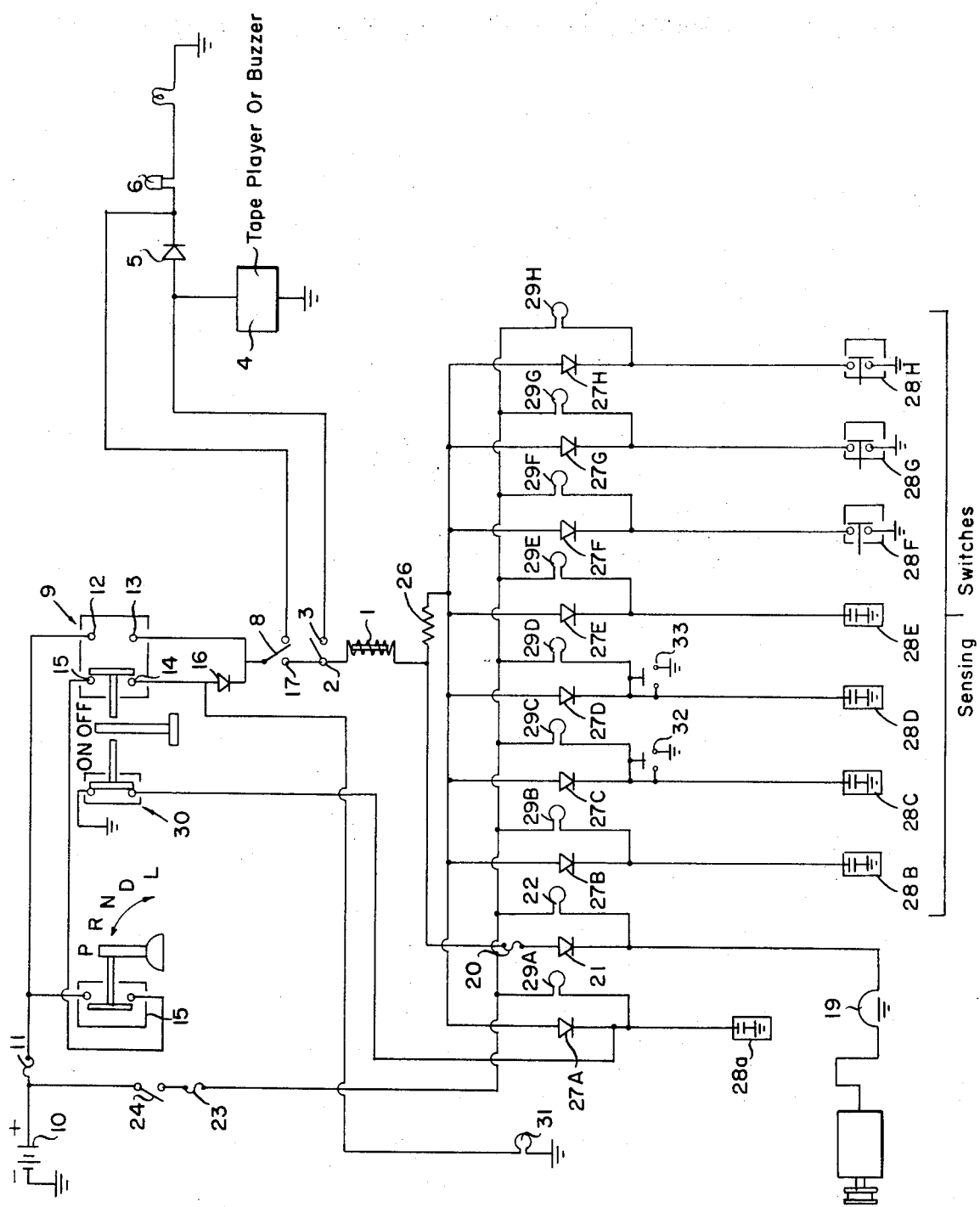

VEHICLE FUNCTIONAL STATUS AND MONITOR SYSTEM

BACKGROUND OF THE INVENTION

This invention relates generally to a vehicle functional status monitor and warning system. More specifically, it relates to an apparatus which automatically monitors the various operational and safety paramaters of a vehicle and provides an audio and visual warning when a monitored function exceeds acceptable tolerances. Also within the scope of the invention are the concepts of fail-safe operation provided via dual redundant signalling means and compatability with existing vehicle functional and safety monitoring means.

In the past systems have been provided to monitor various functional and safety features of vehicles. However, these devices provide an unobtrusive visual signal which in most instances is not noticed by the operator until the faulty condition has progressed to a point where excessive harm has resulted. For instance, oil pressure and current indicator lamps are provided on most automobiles today but during bright daylight conditions their indications are barely noticeable. Also, depending on the orientation of the vehicle and sun, the indicators appear to be on when in fact they are off. These prior systems are prone to undetected malfunctions since they do not incorporate self test features or redundant indicators. Hence, if an indicator bulb becomes defective, the operator will be unaware of abnormal functions until such time that the abnormal situation causes a catastrophic failure.

OBJECTS OF THE INVENTION

The preceeding and other shortcomings of prior vehicle monitor and warning systems are overcome by the invention presented herein.

One object of the invention is to provide a redundant vehicle monitoring system which is not affected by failure of an indicator.

Another object of the invention is to provide a single visual indicator capable of attracting the attention of a vehicle operator under all conditions to warn him of a failure or out-of-limits condition of any one of the monitored functions.

A further object of the invention is to provide an audio signal which will warn a vehicle operator of the existence of improper functions and provide directions as to the proper procedure to follow in view of the condition.

Another object of the invention is to provide a vehicle warning system providing the above objects which can be readily adapted to a vehicle.

A further object of the invention is to provide a fail-safe warning system that is compatible with existing vehicle warning systems and can be readily adapted to co-operate therewith.

Another object of the invention is to provide a fail-safe monitoring and warning system which is easy to manufacture, inexpensive to produce and readily adaptable to existing or new vehicles.

The above and other objects and features of this invention will become more fully apparent and readily understood from the following description and accompanying drawing.

SUMMARY OF THE PREFERRED EMBODIMENT

The monitoring and warning system of the invention includes a flashing lamp visual indicator and a pre-recorded audible warning and instruction means that are responsive to a plurality of monitored functions of a vehicle via a relay and isolation diode rectifiers. Indicator lamps for the individual monitored functions are provided in parallel with the isolation diodes to provide redundant indication for each monitor circuit. Also included are push to test switches which provide a self-test capability for selected monitor circuits and the flashing light and audio warning means.

DRAWING

The FIGURE is a schematic diagram of the invention.

DETAILED DESCRIPTION OF THE INVENTION

The present invention, as illustrated in the FIGURE, includes a control relay 1 including a normally open set of contacts 2 and 3. Contact 3 of the relay provides a power connection to the audible warning means 4. In the preferred embodiment warning means 4 includes a tape player having a pre-recorded warning and emergency operating instructions to the operator contained therein. In alternate embodiments the audible warning means 4 is a buzzer or bell. Also connected to contact 3 is a series circuit comprised of an isolation diode rectifier 5, flashing means 6 and indicator lamp 7. The flashing means 6 and indicator lamp 7 series circuit is also connected through switch 8 to the double emergency brake switch 9 which provides a positive current source from the primary vehicle power distributor point or battery 10 via fuse 11 through one set of contacts 12 and 13. The other set of contacts 14 and 15 of switch 9 provide an electrical connection to the primary power source via fuse 11 and switch 15 which is responsive to the position of the vehicle transmission gear selector such that the switch 15 is open when the selector is in the park position and closed at all other times. Contact 14 is connected via an isolation diode 16 to switch 8.

The circuit thus far described provides power to the control relay 1 when switch 8 is in the operate position 17. This power circuit is through isolation diode 16, contacts 14 and 15 of switch 9 and switch 15 when the emergency brake is on and the transmission gear selector is in any position except park. When the emergency brake is off, power is provided to relay 1 via switch 8 and contacts 12 and 13 of switch 9. Therefore, if the vehicle transmission gear selector is in park and the emergency brake is on, relay 1 will be disabled. If the emergency brake is released or the gear selector placed in any position other than park, relay 1 will have power available to energize its coil and a warning will be provided as a function of the monitor circuits which will be explained below. If switch 8 is in the inhibit position 18, relay 1 will be disabled but current will be provided to the visual signal means comprised of flasher 6 and light 7 when the emergency brake is off or the transmission gear selector is not in park.

The coil of relay 1 is connected to contact 2 and provided with a source of current as described above. The other side of the relay coil is connected to the voltage regulator 19 at the point to which the alternator output indicator 22 is normally connected. This coil connection is via the series circuit comprised of fuse 20, diode rectifier 21 and switch 34 such that if the alternator output is below a minimum value, relay 1 will be energized causing audio warning means 4 and visual warning means 7 to activate. To ensure operation of relay 1 through this circuit, the relay must have a coil voltage rating of approximately 50 percent of the voltage supplied by the primary vehicle power distribution system, i.e., when used in a vehicle having a 12 volt system, a 6 volt relay is used. Warning lamp 22 will also be activated by this condition via fuse 23 and the ignition switch 24.

An alternate path to ground for the coil of relay 1 is provided through resistor 26 which is selected to reduce the primary voltage of the vehicle by 50 percent and the parallel monitoring circuits comprised of diode rectifiers 27A-N and sensing switches 28A-N. The sensing switches 28A-N are normally open so when a condition to which they are responsive to occurs they provide a path to ground for relay 1 and cause activation of the warning system. Each sensing switch 28A-N is also provided with a backup or alternate indication means comprised of lights 29A-N which form a series circuit with the sensing switch and ignition circuit as described above for light 22. It is to be understood that the various functions monitored by sensing switches 28A-N as illustrated in the FIGURE are merely exemplary and no intention is made to limit the scope of this invention to only those functions.

Switch 30 is mechanically coupled to the emergency brake and closed when the emergency brake is on. It is connected in parallel with sensing switch 28A which is responsive to brake fluid level or pressure, hence this warning circuit is activated by leaving the emergency brake on or by low hydraulic fluid in the brake system.

Indicator 31 provides a lamp indication when the parking brake is on but the transmission is not in park.

Push to test switches 32 and 33 provide a means to place a ground potential in the monitoring circuits to simulate an out of tolerance condition and thus provide a self test capability for the warning system. Only two test switches are illustrated but it is contemplated that all monitor circuits may be thus provided and the push to test switches may be of the type incorporated in lamp sockets.

Normally closed push to test switches 34 and 35 incorporated in the current and oil pressure monitor circuits function to enable selective deactivation of the individual test branches associated therewith. Thus switches 34 and 35 may be used to prevent the current or oil pressure circuit from activating the system when the engine is not running and thereby enable testing of the remaining monitored functions.

This invention is not limited to the particular details of the preferred embodiment illustrated. It is contemplated that various modifications and applications of the principles of the invention may be made within the scope of the invention by those skilled in the art.

What I claim as new and desire to secure by Letters Patent of the United States is:

1. A monitor and warning system for a vehicle having a transmission gear selector means, hydraulic brake means, emergency brake means, and a direct current electrical power system including a battery, a voltage regulator and ignition switch, comprising:
   a relay;
   an audio warning means responsive to said relay;
   a visual warning means responsive to said relay;
   a double switch means responsive to said vehicle emergency brake and including a normally open switch including first and second contacts and a normally closed switch including third and fourth contacts electrically connected between said vehicle battery and said relay;
   a normally closed switch responsive to said vehicle transmission gear selector means park position and electrically connected between said double switch means first contact and said vehicle battery;
   a first diode electrically connected between said relay and said double switch means second contact;
   a first lamp connected between said vehicle electrical ground and said double switch means second contact;
   a plurality of monitor circuits each including an isolation diode connected to said relay and a normally open sensing switch responsive to independent functions of said vehicle and including a first contact connected to said vehicle electrical ground and a second contact connected to said isolation diode.

2. The system defined in claim 1 wherein said visual warning means includes:
   a voltage responsive intermittent switch means; and
   an indicator lamp.

3. The system defined in claim 2 wherein said audio warning means is an electrical buzzer.

4. The system defined in claim 3 wherein said audio warning means includes a magnetic recording tape player including a pre-recorded tape containing an audible warning and emergency operating procedure.

5. The system defined in claim 4 including:
   a second diode electrically connected to said vehicle voltage regulator;
   a fuse electrically connected between said second diode and said relay; and
   a resistor interposed between said relay and said isolation diodes.

6. The system defined in claim 5 wherein said monitor circuits are responsive to said vehicle oil pressure, engine temperature, fuel quantity, speed, door opening, hood opening, trunk opening, and hydraulic brake system.

7. A monitor and warning system for a vehicle having a transmission gear selector means, hydraulic brake means, emergency brake means and a direct current electrical power system including a battery, a voltage regulator and ignition switch, comprising:
   a relay including a normally open electrical switch having first and second contacts and a coil having a voltage rating of one half of the voltage provided by said vehicle electrical power system electrically connected to said first contact of said relay switch;
   a magnetic recording tape player including a pre-recorded tape containing an audible warning and emergency operating instruction responsively connected to said second contact of said relay switch;
   a voltage responsive intermittent switch means;
   a first diode electrically connected between said relay switch second contact and said voltage responsive intermittent switch means;
   a first lamp electrically connected between said voltage responsive intermittent switch means and said vehicle electrical power system ground;
   a single pole double throw switch including first, second and pole contacts, said first contact electrically connected to said relay switch first contact and said second contact electrically connected to said electrical connection between said first diode and said voltage responsive intermittent switch;

a first fuse electrically connected to said vehicle battery;

a double switch means responsive to said vehicle emergency brake including a normally open switch including first and second contacts, and a normally closed switch including third and fourth contacts;

said normally closed switch electrically connected between said first fuse and said single pole double throw switch pole contact;

a second diode electrically connected between said double switch means second contact and said single pole double throw switch pole contact;

a normally closed switch means responsive to said vehicle transmission gear selector park position electrically connected between said double switch means first contact and said first fuse;

a second lamp means electrically connected between said double switch second contact and said vehicle ground;

a third diode connected to said vehicle voltage regulator current monitor contact;

a second fuse electrically connected between said relay coil and said third diode;

a third lamp electrically connected between said vehicle ignition switch and said vehicle voltage regulator current monitor connection;

a resistor electrically connected to said relay coil;

a fourth diode electrically connected to said resistor;

a first normally open switch electrically connected between said fourth diode and said vehicle ground and responsive to said vehicle emergency brake;

a second normally open switch electrically connected in parallel with said first normally open switch and responsive to said vehicle hydraulic brake system abnormal functioning;

a fourth lamp connected between said first and second normally open switches and said vehicle ignition switch; and a plurality of monitor circuits each including an isolation diode connected to said resistor, a normally open sensing switch means responsive to independent functions of said vehicle and including a first contact connected to said vehicle electrical ground and a second contact connected to said isolation diode, and an indicator lamp electrically connected between said sensing switch second contact and said vehicle ignition switch.

8. The system defined in claim 7 wherein one of said monitoring circuits is responsive to said vehicle oil pressure including:

a first normally closed push button switch electrically interposed between said vehicle voltage regulator current monitor contact and said third diode and said third lamp; and a second normally closed push button switch electrically interposed between said vehicle oil pressure monitoring circuit normally open sensing switch and said isolation diode and said indicator lamp.

9. The system defined in claim 8 wherein said monitoring circuits are responsive to said vehicle engine temperature; fuel quantity, vehicle speed, vehicle hood opening, vehicle trunk opening and vehicle door opening.

10. The system defined in claim 9 wherein said first, second and third lamps and said indicator lamps incorporate press to test light sockets.

* * * * *